United States Patent [19]
Desai et al.

[11] Patent Number: 5,921,678
[45] Date of Patent: Jul. 13, 1999

[54] MICROFLUIDIC SUB-MILLISECOND MIXERS

[75] Inventors: Amish Desai; Xing Yang; Yu-Chong Tai; Elaine Marzluff; Dirk Bockenkamp; Stephen Mayo, all of Pasadena, Calif.

[73] Assignee: California Institute of Technology, Pasadena, Calif.

[21] Appl. No.: 09/019,071

[22] Filed: Feb. 5, 1998

Related U.S. Application Data

[60] Provisional application No. 60/037,315, Feb. 5, 1997.

[51] Int. Cl.$^6$ .................................................. B01F 5/06
[52] U.S. Cl. .................... 366/336; 366/173.1; 366/340; 366/348; 366/349
[58] Field of Search .................. 366/173.1, 336, 366/150.1, 158.5, 162.4, 167.1, 174.1, 175.2, 177.1, 181.5, 182.1, 262, 337, 340, 348, 349

[56] References Cited

U.S. PATENT DOCUMENTS

5,486,335  1/1996  Wilding et al. .......................... 422/55

*Primary Examiner*—Tony G. Soohoo
*Attorney, Agent, or Firm*—Fish & Richardson P.C.

[57] ABSTRACT

A micromachined, high Reynolds number, sub-millisecond liquid mixer for the study of chemical reaction kinetics. This bulk micromachined silicon mixer is capable of initiating and quenching chemical reactions in intervals as short as 100 μs. The mixer chip contains two tee mixers connected by one channel which serves as a reaction chamber. Each tee mixer consists of opposing channels where liquids meet head-on and exit into a third channel forming the base of a "T".

33 Claims, 7 Drawing Sheets

Flow Rate: 100μL/s

Flow Rate: 500μL/s

| | Indicator Unchanged |
| | Reaction with Acid |
| | Reaction with Base |

FIG. 10

MICROFLUIDIC SUB-MILLISECOND MIXERS

This application claims benefit under 35 USC 119(e) of the U.S. Provisional Application No. 60/037,315 filed on Feb. 5, 1997, the entirety of which is incorporated herewith by reference.

FIELD

This disclosure relates to chip-based chemical analysis systems. More specifically, this disclosure relates to fabrication of a micro-electromechanical systems ("MEMS") sub-millisecond liquid mixer, one application of which is the study of chemical reaction kinetics.

BACKGROUND

Liquid-phase reaction kinetics includes the study of the process of chemical reactions in liquids. Much of the chemistry occurs in sub-millisecond time-scales. Many biological processes such as cell activation, enzyme reactions, and protein folding also require sub-millisecond analysis to investigate intermediate states formed during the reaction. Reactants are often mixed to initiate the chemical reaction.

For example, liquid reactants A and B are mixed to produce product C. The initiation point of this reaction is when the reactants A and B come in contact with one another. The reactants A and B can be mixed together by a mixer. The reactants A and B are allowed to react for a defined duration called the delay. After the delay, the reaction can be quenched by adding reaction inhibitor D. The stopping point of this reaction is when the reactants A and B come in contact with reaction inhibitor D. The reactants A, B, product C and inhibitor D are all mixed together.

Both the initiation point and stopping point may not be instantaneous in a practical mixer. A certain length of time is generally required for the substances in the reaction to adequately mix together. This length of time between the first point of encounter and the point when the substances are completely mixed is called the dead time.

Reduction of dead time better defines the initiation point and stopping point of the chemical reaction. Control of the reaction time by varying the delay is desirable. The delay is the time after the initiation point and before the stopping point, during which the reactants A and B react to produce C. The product C is then collected for further analysis. A high speed mixer apparatus that allows varying delay times and continuous product collection is desired.

Most chemical analysis protocols prefer sub-millisecond mixers that allow short delay times, if the reaction rate is fast, e.g., having sub-millisecond reaction time constants.

Some conventional mixers that allow millisecond mixing are available.

One such mixer is the Berger ball mixer. The fluids to be mixed are injected onto a ball. The flow velocity at which the fluid streams are injected onto the ball drives the fluids around the ball. The flow of the different fluid streams around the curved surface of the ball causes turbulence. Mixing rates can be increased by increasing the flow velocity of the injected fluids thereby increasing the turbulence experienced by the fluids. Berger ball mixers can be implemented in computer controlled fluid delivery systems such as the BioLogic SFM4/Q Quenchflow, available from Molecular Kinetics, WA. These setups can have dimensions of 1 in×0.5 in×0.5 in.

One undesirable feature of some Berger ball mixer setups is additional dead volume. Dead volume is the volume the liquid sample occupies in an apparatus. If mixers are not integrated, the reactants are transferred from one mixer to the other the volume that is taken up during the transfer adds to the total dead volume.

The Berger ball mixer setups are relatively large devices that typically allow reaction delay times of around 3 ms. Any significant delay shorter than 3 ms are usually not attainable.

Mixing using multicapillaries and free jet mixing has also been demonstrated. These methods are not usually adapted for use for a second quench after the first mixing. The capability of a second quench and/or subsequent mixing steps are sometimes desired for studying reaction intermediate states.

Chemical analysis sometimes require the ability to stop the reaction and thus "freeze" the chemical state of the reactants in time. An apparatus that can "freeze" the chemical state of the reactants after a controlled delay is desired.

In the micro-electromechanical systems ("MEMS") field, micro-mixing devices fabricated have operated in low Reynolds numbers, e.g. less than 2000. Low Reynolds numbers regimes results in mixing times on the order of seconds.

SUMMARY

The inventors disclose a sub-millisecond micromachined mixer. A chemical reaction technique to calibrate this mixer is also presented. The sub-millisecond micromachined mixer operates at a high Reynolds number, e.g. between 2,000 and 6,000. One embodiment features a 1 cm×1 cm×1 mm, standard chip size, bulk micromachined silicon mixer. Smaller embodiments are also possible. The mixer can also be fabricated on other materials. This mixer is capable of initiating and quenching (starting and stopping) chemical reactions in intervals as short as 100 $\mu$s.

In one embodiment, the mixer chip has two tee-shaped mixers connected by a channel which serves as a reaction chamber. Two opposing liquid streams are injected into the mixer chip. Each tee mixer has opposing channels where liquids meet head-on and exit into a third channel forming the base of a "T". In an embodiment where the two opposing liquid steams have similar flow velocities, the exit into the third channel is at a 90 degree angle. Other shapes, featuring different angles, can be fabricated. Flow velocities determine the optimum angles.

The micromachined mixer performance can be characterized by employing two fast hydrolysis chemical reactions with reaction time constants of 3 ms and 9 ms along with visualization techniques using dyes and acid-base indicators, such as phenolphthalein and bromothymol blue.

Shorter delay length, down to e.g., sub $\mu$m size, may be possible with micromachining because several mixers can be integrated on one chip and several mixing events in series or parallel can be initiated. MEMS resolution of 10 $\mu$m can be achieved. The micromachined device enables smaller dead volumes.

The chip-based integrated mixers also allow continuous collection of samples for analysis. Performance results show that the micromachined mixers outperform commercial devices such as Berger ball mixers by an order of magnitude.

BRIEF DESCRIPTION OF THE DRAWING

These and other aspects will be described with reference to the drawings, in which.

DESCRIPTION OF THE PREFERRED EMBODIMENTS

One purpose of this disclosure is to provide a method to increase the mixing speed of the mixers. Although the mixing of fluids is fundamentally governed by molecular diffusion, turbulence in the flow can enhance mixing by many orders of magnitude. Greater turbulence in the flow field, e.g. Reynolds number Re>2000, can increase reactant area and reduce reaction times. The micromachined mixers are to be used in high Reynolds number regimes to minimize mixing time.

The inventors' micromachined mixers are injected with high velocity fluid streams. The fluid streams, flowing in etched channels, meet head-on in an intersection of the etched channels, thereby mixing. This high fluid velocity is directly proportional to the pressure pushing on the fluid and the turbulence in the mixer. High turbulence is characterized by high Reynolds numbers, e.g. 2000–6000. Materials, such as <110> silicon wafers, used for the micromachined mixer can accommodate flow rates of 1.5 mL/s.

Mixer Chip

Figure 1:
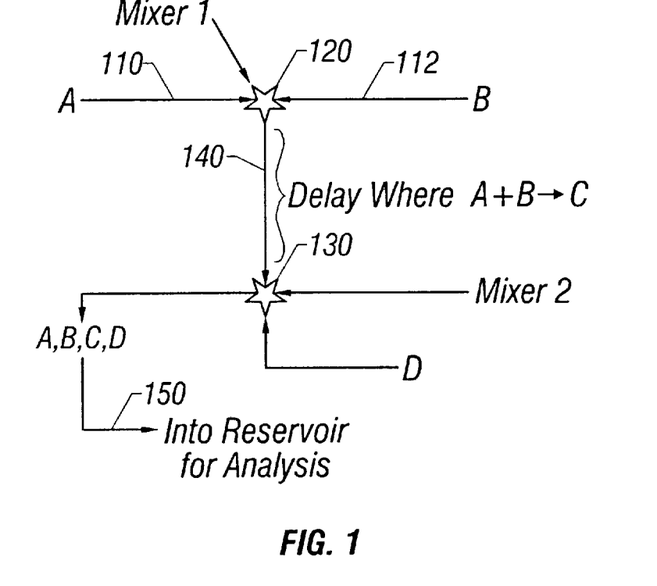
FIG. 1 is a diagram of one embodiment of investigating intermediate states of fast liquid-phase reactions.

FIG. 1 is a diagram of one embodiment of investigating intermediate states of a fast liquid-phase reaction. The lines 110, 112 represent fluid channels. The stars 120, 130 represent mixing points. First mixer 120 mixes reactants A and B which react to form product C. Product C and reactants A and B travel through delay channel 140 which connects first mixer 120 to second mixer 130. The length of the delay channel 140 and speed of travel determine the delay time allowed for the reactants A and B to react. Reaction inhibitor D is mixed with A, B, and C at second mixer 130 to stop the reaction. The mixture of A, B, C, and D then flows into a reservoir 150 for analysis.

Figure 2:
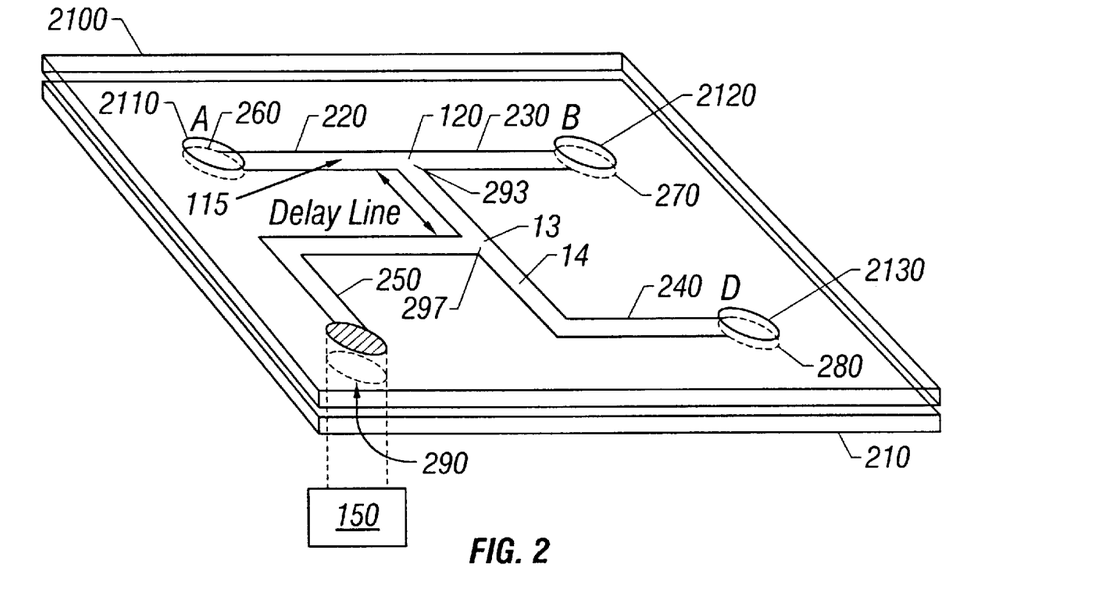
FIG. 2 is a three dimensional view of the first embodiment mixer chip.

FIG. 2 is a perspective view of the first embodiment mixer chip. A support substrate 210, preferably a <110> silicon wafer is etched to form a system of fluid channels 115. These <110> silicon wafers are selected for their ability to hold channels through which high speed fluids can be injected. This system of fluid channels 115 has a first reactant channel 220, a second reactant channel 230, a delay channel 140, an inhibitor channel 240, and a reservoir channel 250. A first reactant inlet area 260 is formed on the support substrate 210. The first reactant channel 220 is positioned to feed fluid out of the first reactant inlet area 260. A second reactant inlet area 270 is formed on the support substrate 210. The second reactant channel 230 is positioned to feed fluid out of the second reactant inlet area 270. A first mixer 120 is formed at an intersection 293 of the first reactant channel 220, the second reactant channel 230, and the delay channel 140. The first mixer 120 mixes the first and second reactants, A, B.

An inhibitor inlet area 280 is formed on the support substrate 210. The inhibitor channel 240 is positioned to feed fluid out of the inhibitor inlet area 280. A reservoir outlet hole 290 is etched onto the support substrate 210. The reservoir channel 250 is positioned to feed fluid into the reservoir outlet hole 290. The reservoir outlet hole 290 is connected to the reservoir 150. A second mixer 130 is formed at an intersection 297 of the delay channel 140, the inhibitor channel 240, and the reservoir channel 250. The second mixer 130 mixes the first and second reactants, A, B, the product C, and the inhibitor D. The mixture of A, B, C, D flows into the reservoir channel 250 and out through the reservoir outlet hole 290 to the reservoir 150.

The first and second mixers, 120, 130 are positioned at intersections, 293, 297. These intersections have a "T" shape and the mixers are hence called "Tee mixers". Two opposing liquid streams are injected into the mixer chip. Each tee mixer has opposing channels where liquids meet head-on and exit into a third channel forming the base of a "T". In an embodiment where two opposing liquid steams have similar flow velocities, the exit into the third channel is at a 90 degree angle. Other shapes, featuring different angles, can be fabricated. Flow velocities determine the optimum angles.

Figure 3A:
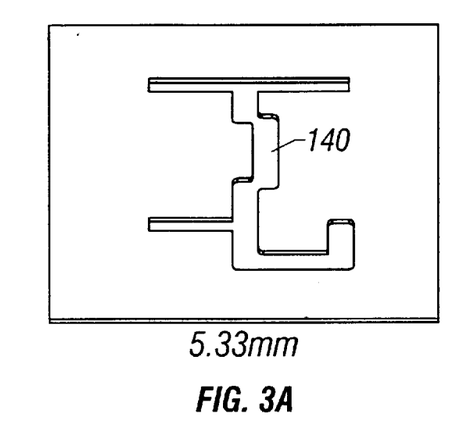
FIGS. 3A, 3B, 3C show varying delay lengths on a mixer chip.
Figure 3B:
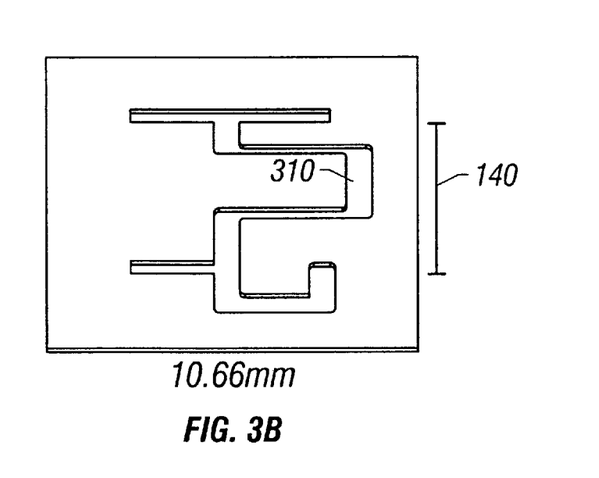
Figure 3C:
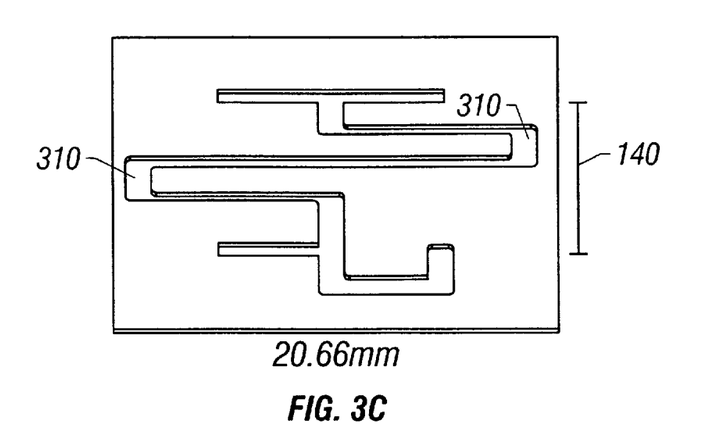

The mixer chip can be fabricated to have various delay lengths by varying the length of the delay channel 140. FIGS. 3A, 3B, 3C show delays of 5.33 mm, 10.66 mm and 20.66 mm respectively. Bends 310 of varying length can be introduced into the delay channel 140 to increase the total length of the delay channel 140. Short delays of 10 µm can also be made.

In one embodiment, thermal oxide is used as a mask for the fluid channel system 115. Channels which are 80–300 µm deep, preferably 150 µm deep, and 200–600 µm wide, preferably 408 µm wide are etched. The etching uses 70° C. KOH on the silicon support substrate 210 for about 2.2 hours. A reservoir outlet hole 290 with a 750 µm diameter is drilled into the support substrate 210. The support substrate is etched to form the fluid channel system 115. The first reactant inlet area 260, the second reactant inlet area 270, and the inhibitor inlet area 280 is formed on the support substrate 210 such that liquid can be deposited into these areas and fed out of these areas via the fluid channel system 115. These areas are not holes through the support substrate layer 210.

A cover layer 2100, preferably made of PYREX(™) 7740 glass, is drilled to form three holes 2110, 2120, 2130 corresponding to first reactant inlet area 260, the second reactant inlet area 270, and the inhibitor inlet area 280, respectively. These holes 2110, 2120, 2130 are preferably the same diameter as the diameter of the first and second reactant inlet area, 260, 270 and the inhibitor inlet area, 280. In this embodiment, all holes are 750 µm in diameter. The glass layer 2100 is anodically bonded to the support substrate 210 forming the mixer chip.

This mixer chip can operate at high Reynolds number, e.g. 2000–6000. One embodiment has dimensions of 1 cm×1 cm×1 mm. This embodiment is capable of initiating and quenching chemical reactions in intervals as short as 100 microseconds.

During operation, high speed fluids are injected into the first reactant inlet area 260, the second reactant inlet area 270, and the inhibitor inlet area 280 through the holes 2110, 2120, 2130 in the cover layer 2100.

Mixer Chip with Flow Regulation Device

Figure 4:
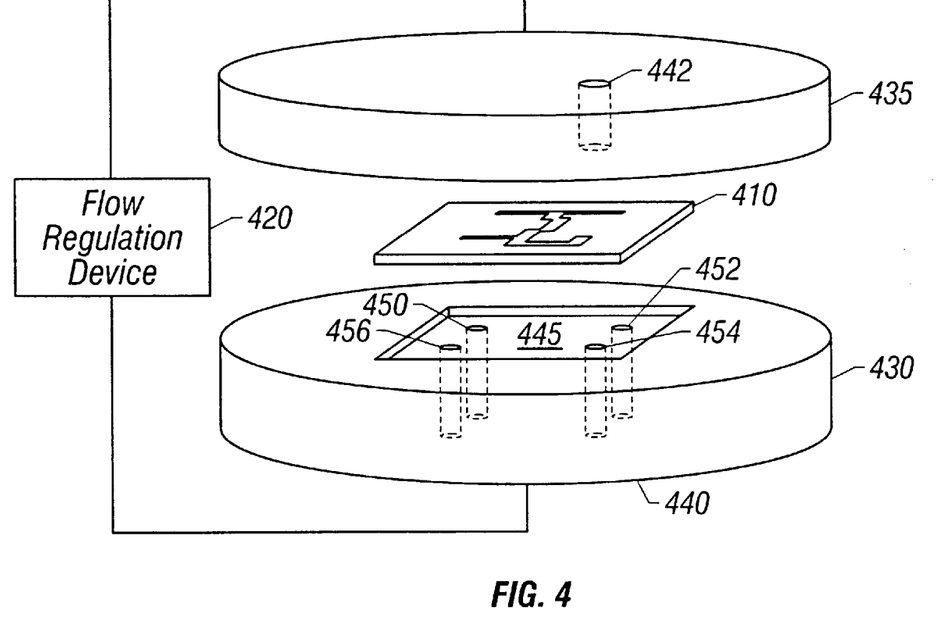
FIG. 4 shows a mixer chip interfacing with a flow regulation device.

As shown in FIG. 4, the mixer chip 410 can be used to interface with a computer controlled fluid delivery system, flow regulation device 420, preferably a BioLogic SFM4/Q, available from Molecular Kinetics, WA. The flow regulation device 420 functions to control the input flow rates of the first and second reactants, A, B, and also the inhibitor, D. Holders 430, 435, preferably a combination of kel-f holders 440, 442 with o-rings 450, 452, 454, 456 secures the mixer chip 410 onto the flow regulation device 420. Kel-f is a hard plastic substrate. A piece of kel-f is machined into two 1 cm² cylindrical blocks, 440, 442. Each block has an area 445 where a mixer chip 410 can be imbedded. Four O-rings 450, 452, 454, 456 made of a soft plastic are placed on area 445. O-rings 450, 452, 454, 456 correspond to the first inlet area 260, the second inlet area 270, the inhibitor inlet area 280, and the reservoir outlet hole 290, respectively. Clamping two holders, 430, 435, together seals the mixer chip 410. The o-rings form a tight seal between the mixer chip 410 and the kel-f holders 440, 442. This seal tolerates high pressures from high flow velocity and Reynolds numbers of 2000–6000. Additional o-rings can be placed between the kel-f holders and the mixer chip to provide a mechanical buffer for the mixer chip.

Fluids at controllable flow rates up to 1.5 mL/s can be injected into the first reactant inlet area 260, the second reactant inlet area 270, and the inhibitor inlet area 280 through the holes 2110, 2120, 2130, respectively in the cover layer 2100. Since the dimensions of the fluid channel system 115 are known, by controlling the flow rates the reaction time can be controlled. Furthermore, by using a well calibrated chemical reaction, the actual delay between the two mixing steps can be confirmed.

Mixer Chip Having Micro-Turbulence Generators

Figure 5A:
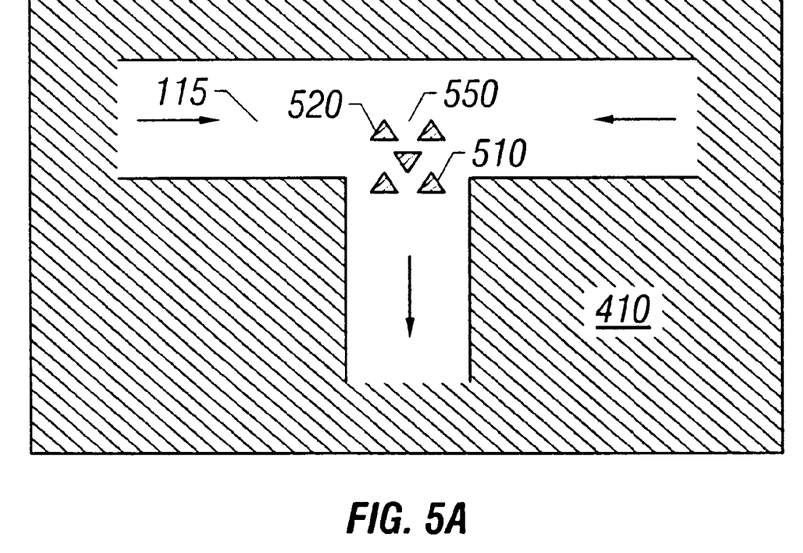
FIGS. 5A–5B show an embodiment that incorporates micro-turbulence generators into the fluid channels of a mixer chip.
Figure 5B:
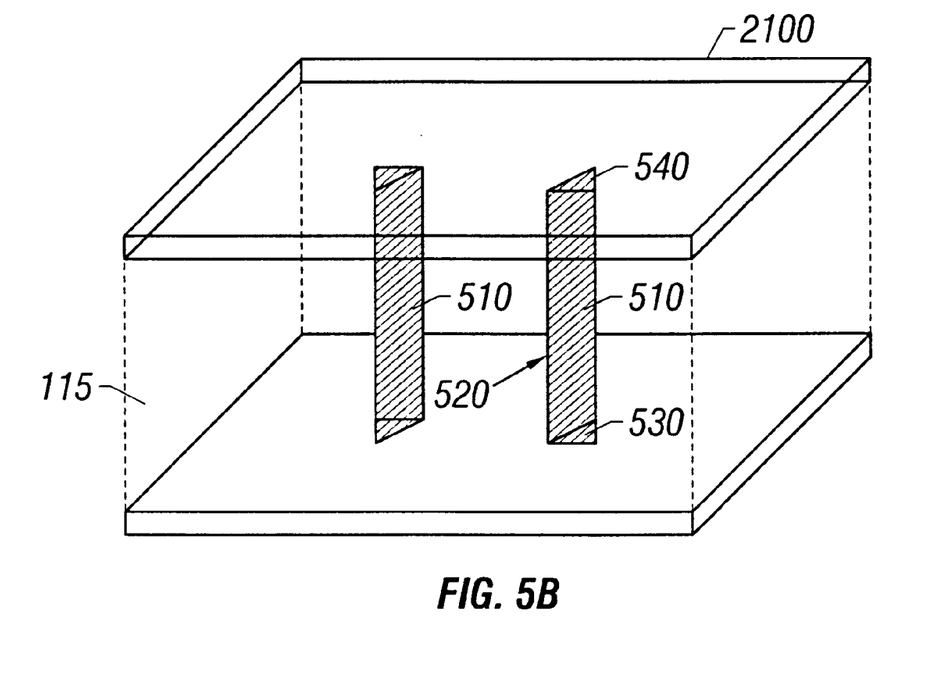

FIGS. 5A–5B show another embodiment that incorporates micro-turbulence generators 510 into the fluid channels 115 of a mixer chip 410. Sharp edges 520 can be introduced into the fluid channels 115 of a mixer chip 410 by placing pillars 510 in the fluid channel 115. The pillars are preferably sharp-edged triangles with their points oppositely pointing, as shown. These sharp edged pillar structures 510 function as micro-turbulence generators. Fluid samples are injected into the fluid channels 115 at high velocities. The turbulence experienced by the fluid samples are increased when the fluid flow is broken by sharp edges 520 in the channel 115. Increased turbulence produces faster mixing times.

FIG. 5B shows pillar structures 510 in fluid channels 115. The pillar structure 510 is connected on one end 530 to the floor of the fluid channel, touching the support substrate 210. The opposite end 540 of the pillar structure is connected to the roof of the fluid channel, touching the cover layer 2100. The pillar structures 510 have dimensions that allow passage of fluids through the fluid channel 115. Fluid sample come in contact with the sharp edges 520 of the pillar structure as the fluid sample flows past the pillar structures 510 inside the fluid channels 115.

Pillar structures 510 can be placed at an intersection 550 of the fluid channels 115 as shown in FIG. 5A. Pillar structures 510 can also be placed elsewhere in the fluid channel 115. Another embodiment may feature pillar structures with only one end fixed to the channel.

Triangular-shaped pillar structure is one embodiment. Other shapes that introduce sharp edges into the fluid channels can also be used to increase turbulence in the mixer chip.

Chemical Calibration Method and Theory

The mixer chip 410 is calibrated with two pseudo first order reactions. The concentration of one of the reactants relative to the other reactant is essentially unchanged through the reaction. Hence the reaction has a reaction rate constant similar to that of a first order reaction. The first reaction, the hydrolysis of DNPA (2,4 dinitrophenylacetate), is a well studied reaction specifically suitable for sub-millisecond mixing. The DNPA is hydrolyzed by a base, sodium hydroxide, DNP (dinitrophenol) is formed as shown in equation 1, 2, and 3.

$$DNPA + NaOH \rightarrow DNP + Acetic\ Acid \tag{1}$$

$$-\frac{dC_{DNPA}(t)}{dt} \cong k' \cdot C_{DNPA}(t) \tag{2}$$

$$where\ k' = k \cdot [OH^-] \tag{3}$$

k is the rate constant of this reaction, and [OH⁻] represents the hydroxide concentration. This reaction is pseudo first order as, shown in equation 4, with a time constant, τ=1/k', if [DNPA]<<[OH⁻], i.e., $$C_{DNPA}(t) = C_{DPNA}(O) \cdot e^{-t/\tau} \tag{4}$$

Experimentally, this reaction is quenched at the second mixer 130 with HCl which neutralizes the NaOH. Mixer chips 410 with different delay times can be used to collect fluids with the corresponding reaction times. Then, the UV absorbance of these fluids is measured to determine concentration of unreacted DNPA. The reactant, DNPA, and the product, DNP, have different sensitivities at a wavelength of 320 nm which can be easily detected by a UV Spectrometer.

Mathematically, the absorption dependency to concentration of DNPA and DNP can be described in equation 5, where a and b are absorption coefficients of DNPA and DNP respectively.

$$A(t) = a \cdot C_{DNPA}(t) + b \cdot C_{DNP}(t)) \tag{5}$$

Combining equations 4 and 5 relates the change of absorbance verses reaction time in a first order exponential function:

$$A(t) = (A_0 - A_\infty)e^{-t/\tau} + A_\infty \tag{6}$$

Performance Characterization

Characterization experiments are performed using mixer chips with reaction delay lengths from 2.66 mm to 20.66 mm and flow rates from 100 $\mu$L/s to 1000 $\mu$L/s. Data of absorbance verses reaction time is calculated by varying the flow rates of DNPA and NaOH.

Figure 6:
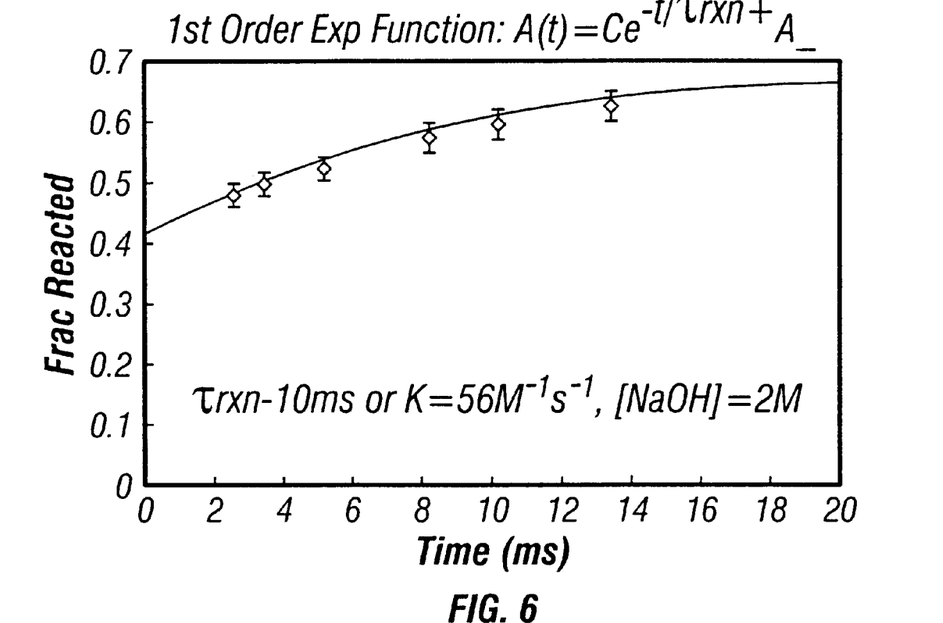
FIG. 6 shows DNPA Absorbance verses Time data for a mixer chip.

FIG. 6 shows an experiment using the inventors' mixer where 2M NaOH is reacted with DNPA for reaction times of 3 ms to 12 ms. This base concentration corresponds to the published rate constant of 56 $M^{-1}s^{-1}$ and a reaction time constant of 10 ms, represented by τ in equation 4.

Figure 7:
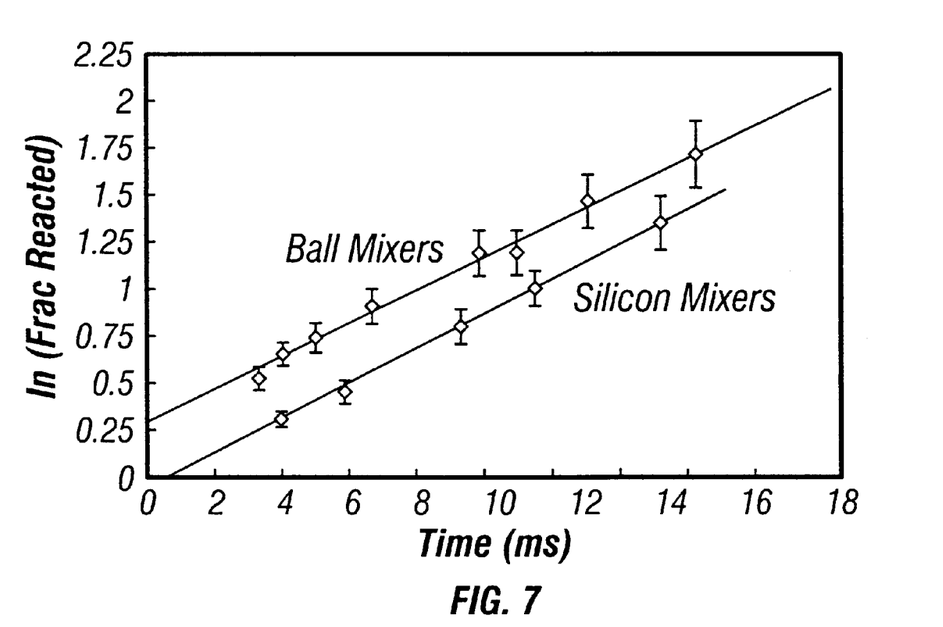
FIG. 7 shows comparative data of conventional Ball mixers and the inventors' mixer chip.

FIG. 7 shows a series of experiments done with both the conventional mixers and the inventors' micromachined mixers for comparison. Linear fits of these experiments produce rate constants of 51 $M^{-1}s^{-1}$ for the inventors' silicon mixer and 46 $M^{-1}s^{-1}$ for the Berger ball mixer. The inventors' mixer data agrees well with the published figure of 56 $M^{-1}s^{-1}$ for DNPA hydrolysis. This good agreement with the published rate constant illustrates that the reaction delay length on the chip agrees with the first order reaction model.

This demonstrates that mixing time is negligible compared to the reaction delay time. In the ideal case of instantaneous mixing, the linear fits should intersect the origin. In other words, at time zero there should be no products, e.g. no change in A(t).

The conventional mixer, e.g. Berger ball mixers, may have some reaction occurring in the mixer stage which causes an upward shift of the data. There is also a shift associated with the inventors' mixers but the value is on the order of the experimental error, e.g. ~±100 $\mu$s.

In order to further characterize the inventors' mixer, a faster chemical reaction is used. To study shorter reaction intervals, a reaction with a shorter time constant is used. FIG. 7 shows, for sub-millisecond reaction times, the change in absorbance is not significant enough for accurate calibration which suggests that the reaction time constant needs to be smaller. Although this modification can be done by simply increasing the base concentration, increasing base concentration can produce problems. Firstly, to reduce the reaction time constant to 3 ms, 4 M base is used. This high base concentration can produce excess heat which in turn will exponentially vary the reaction rate. Furthermore, 4 M NaOH has almost twice the viscosity, as compared with 2 M NaOH, which results in increased back pressure and a lower Reynolds number flow. Lastly, high base concentration is corrosive and can slowly etch the silicon channels of the inventors' mixer.

Figure 8:
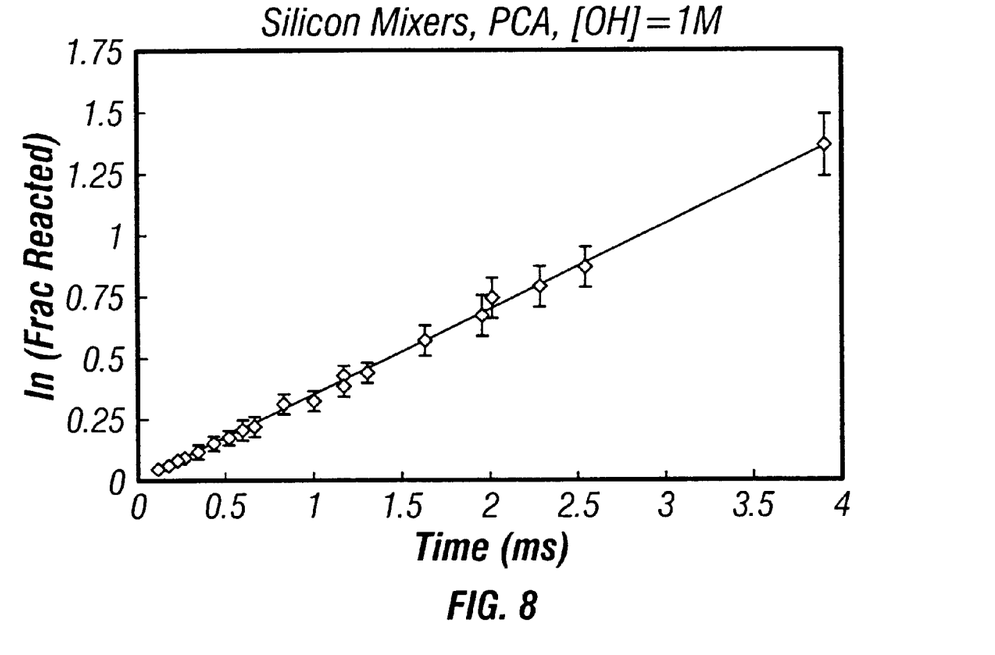
FIG. 8 is a graph of mixer chip with PCA reaction.
Figure 9:
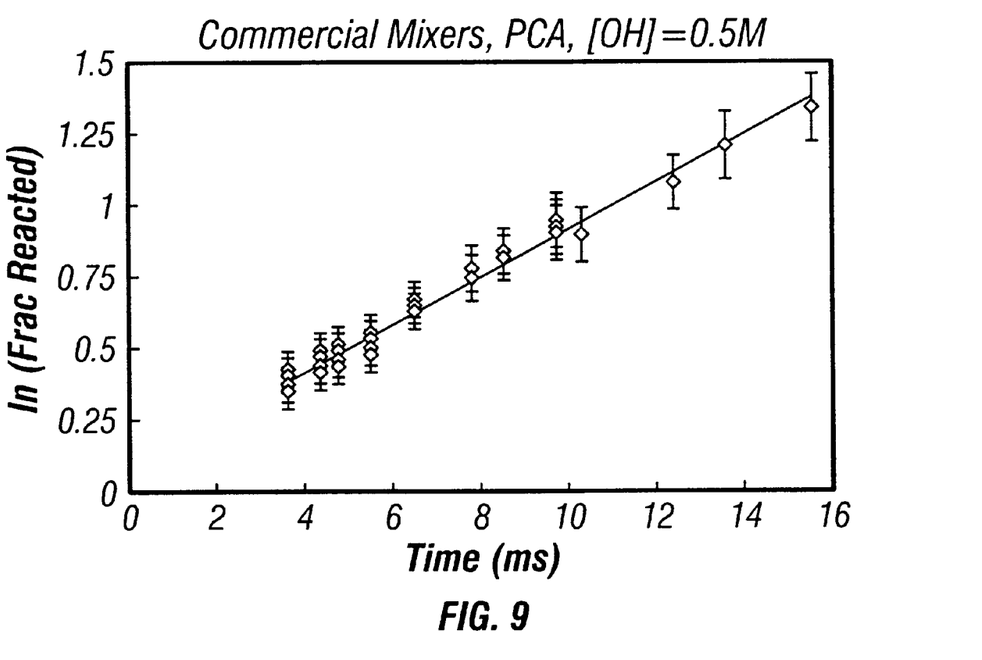
FIG. 9 is a graph of conventional mixer with PCA reaction.

To obviate these problems, a faster reaction, the hydrolysis of phenylchloroacetate (PCA), is used. This reaction has a time constant of 3 ms using 1M NaOH. Characterization experiments are conducted and the rate constant, 430±47.6 $M^{-1}s^{-1}$ with a dead time of 120 $\mu$s±100 $\mu$s are measured with the silicon mixers, as shown in FIG. 8. FIG. 8 reveals the achievement of reaction times as short as 110 $\mu$s. The rate constant derived from the inventors' silicon mixer PCA experiments differ from the conventional mixer by 20%, e.g. 362 $M^{-1}s^{-1}$, a similar trend is noted in the DNPA experiments. The commercial mixers consistently seem to predict a rate constant that is 20% lower from the actual value as shown in FIG. 9.

10% to 20% error in the experimental data is considered good in these types of quench flow experiments where there are a number of sources of error such as manual pipetting of collected solution, time delay in measurements, and a shift in NaOH concentrations over time. Nevertheless, one drawback of the PCA reaction is background hydrolysis. The fast PCA reaction is so sensitive that the PCA reaction slowly hydrolyzes by itself. To reduce this background hydrolysis, the PCA solution and the reacted samples used in the PCA reaction experiments are cooled. However, fast hydrolysis may still contribute errors for some of the shortest reaction time points. Overall, the inventors' silicon mixers have demonstrated a superb performance which is not usually attainable from the conventional state-of-the-art instruments.

The inventors have also used the micromachined mixer in successful protein folding experiments.

Flow Visualization

Flow visualization supports the performance of the inventors' silicon mixers. Flow visualization experiments are performed using acid-base indicators and reaction in 2–5 mm diameter sized pipes to determine downstream mixing distances. To further correlate some of the mixing trends in the inventors' silicon mixers, extensive flow visualization experiments are conducted using the color change of an acid-base indicator, bromothymol blue. Bromothymol blue remains dark green between pH 6.0–7.6, but turns yellow in the presence of acid and blue in the presence of base. Phenolphthalein is another acid-base indicator that can be used.

Figure 10:
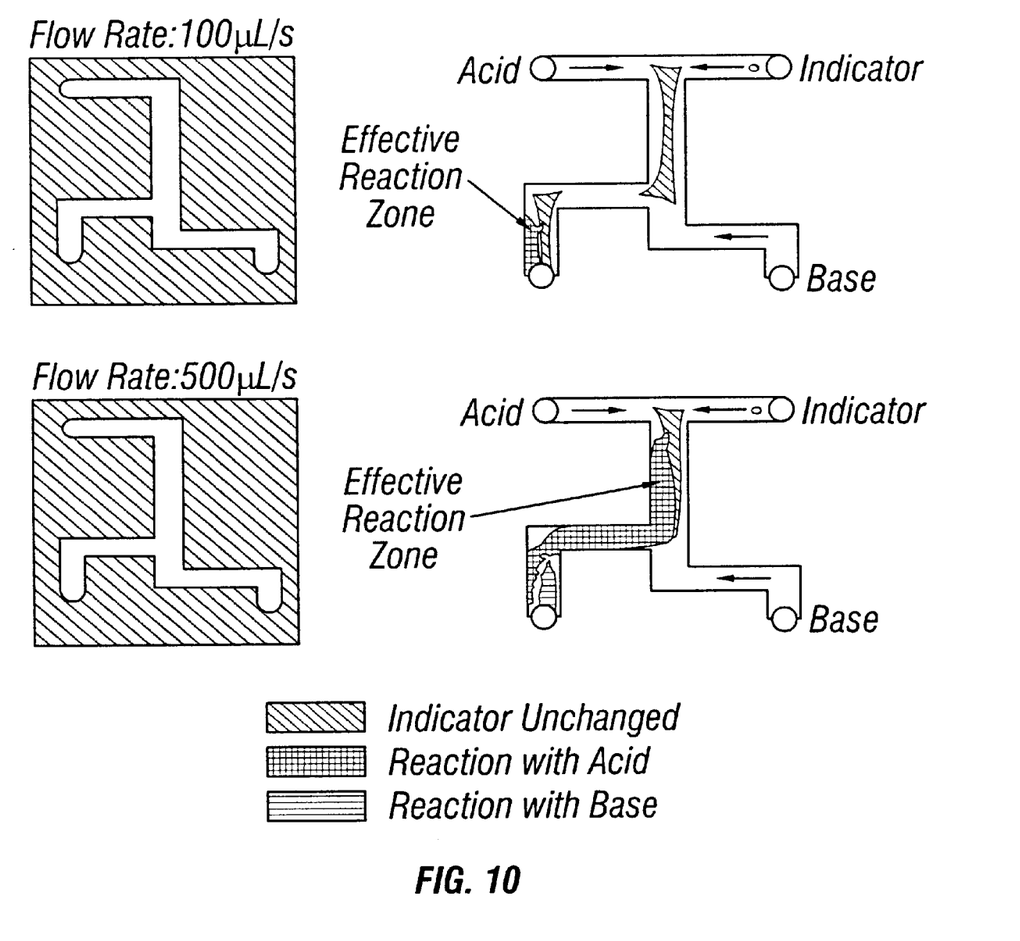
FIG. 10 is a flow visualization picture.

By injecting acid into the first reactant inlet area 260, refer to FIG. 2, the indicator solution into the second reactant inlet area 270, and base into the inhibitor inlet area 280, three color changes, green to yellow to blue, of the indicator are observed. Photographs of mixer chips with delays lengths of 2.66 mm, 5.33 mm, 10.66 mm, and 20.33 mm while varying flow rates in the delay channel from 100 $\mu$L/s to 2000 $\mu$L/s are taken. Two significant trends are observed. First, at low flow rates, a clearly visible interface between the two streams can be seen; at higher velocities such a boundary can not be discerned. This observation agrees well with chemical reaction calibration method. Consistent reaction data is produced at flow rates corresponding to flow rates above ~250 $\mu$L/s. Flow rates below this point resulted in scattered data points below the linear fit. Visualization shows that there are finite mixing delays after the first and second mixing points at all flow rates. These mixing distances, in effect, shift the actual reaction zone without substantially affecting the reaction delay time for the longer delays. Otherwise, the chemical calibration can not have been successful. In fact, the mixing delays can contribute significant error for the mixers that have delay lengths of the same order. To illustrate this effect, two pictures of a 2.66 mm delay chip at 100 $\mu$L/s and 500 $\mu$L/s are shown in FIG. 10. Visual interpretation of these pictures is sketched on the right. The lower photograph shows that second mixing length is almost as large as the reaction pathway itself. The flow visualization is a method to verify the validity of the chemical reaction, and can be used in conjunction with the chemical calibration.

Although only a few embodiments have been described in detail above, those having ordinary skill in the art will certainly understand that many modifications are possible in the preferred embodiment without departing from the teachings thereof. Mixers can be fabricated on materials other than silicon. Mixer geometries provided in the disclosure can be fabricated on other hard materials that can tolerate high flow velocity.

All such modifications are intended to be encompassed within the following claims.

What is claimed is:

1. A method of mixing liquids, comprising:

obtaining a first and second liquid;

obtaining a micro-machined chip, with a substrate that has a first mixer integrated with a second mixer;

mixing said first and second liquid at a Reynolds number greater than 2000 and at a flow rate greater than 250 $\mu$L/s.

2. An apparatus for mixing, comprising:

a support substrate;

a first reactant inlet area formed on said support substrate;

a second reactant inlet area formed on said support substrate;

a inhibitor inlet area formed on said support substrate;

a reservoir outlet hole formed in said support substrate;

a system of fluid channels formed on said support substrate, wherein said fluid channels include a first reactant channel extending from said first reactant inlet area to said inhibitor inlet area, a second reactant channel extending from said second reactant channel to said inhibitor inlet area, a delay channel, an inhibitor channel, and a reservoir channel, said delay channel is positioned at a first intersection of said first reactant channel and said second reactant channel, said inhibitor channel is positioned to feed liquid out of said inhibitor inlet area, said reservoir channel is positioned at a second intersection of said inhibitor channel and said delay channel;

a first mixer, positioned at said first intersection having a shape to mix fluids;

a second mixer positioned at said second intersection having a shape to mix fluids;

a cover layer having a first hole corresponding to said first reactant inlet area, a second hole corresponding to said second reactant inlet area, and a third hole corresponding to said inhibitor inlet area, said cover layer being bonded to said support layer.

3. An apparatus as in claim 2, wherein said support substrate is made of silicon.

4. An apparatus as in claim 2, wherein said support substrate is made of a material that can tolerate flow rates of 1 mL/s.

5. An apparatus as in claim 2, wherein said first reactant inlet area functions to contain a first reactant sample.

6. An apparatus as in claim 2, wherein said second reactant inlet area functions to contain a second reactant sample.

7. An apparatus as in claim 2, wherein said inhibitor inlet area functions to contain an chemical reaction inhibitor.

8. An apparatus as in claim 2, wherein said reservoir outlet hole functions to allow fluids out of said mixer chip.

9. An apparatus as in claim 2, wherein said cover layer is made of PYREX(™) glass.

10. An apparatus for mixing on a substrate, comprising:
a first mixer formed in said silicon substrate;
a second mixer also formed in said silicon substrate;
a system of fluid channels each formed in said silicon substrate including a delay fluid channel, connecting said first mixer to said second mixer.

11. An apparatus as in claim 10, further comprising a glass cover, covering said first mixer, said second mixer, and said system of fluid channels.

12. An apparatus as in claim 11, wherein said support substrate is silicon.

13. An apparatus as in claim 11, wherein said support substrate is a material that can tolerate flow rates of 1 mL/s.

14. An apparatus as in claim 10, wherein said delay channel is 5.33 mm.

15. An apparatus as in claim 10, wherein said delay channel is 10.66 mm.

16. An apparatus as in claim 10, wherein said delay channel is 20.66 mm.

17. An apparatus comprising:
a mixer chip, wherein said mixer chip having a system of fluid channels connecting a plurality of mixers on a common substrate;
a flow regulation device, wherein said mixer chip is positioned to interface with said flow regulation device.

18. An apparatus as in claim 17, wherein said mixer chip is held in position by a combination of several o-rings and kel-f blocks.

19. An apparatus as in claim 18, wherein said kel-f blocks are machined to have an area to imbed said mixer chip.

20. An apparatus as in claim 18, wherein said o-rings form seals between said flow regulation device and said mixer chip that can tolerate high flow velocities.

21. A mixer apparatus comprising:
a mixer chip, wherein said mixer chip having a system of fluid channels connecting a plurality of mixers, said mixers operating at Reynolds number greater than 2000, said mixers capable of initiating and quenching chemical reactions in intervals of shorter than 100 microseconds.

22. A method of characterizing a mixer, comprising:
performing a first order chemical reaction with a specified time constant; and
characterizing said mixer based on a result of said performing.

23. A method as in claim 22, wherein said time constant is 3 ms.

24. A method as in claim 22, wherein said time constant is 9 ms.

25. A method of characterizing a mixer, comprising:
performing visualization techniques using a visual indicator; and
using said visualization techniques to characterize said mixer.

26. A method as in claim 25, wherein said visual indicator is a dye.

27. A method as in claim 25, wherein said visual indicator is an acid-base indicator.

28. A method for mixing, comprising:
first obtaining a first fluid sample;
second obtaining a second fluid sample;
forming a fluid channel with an intersection on a support substrate;
injecting said first and second fluid sample into said fluid channel wherein said first and second fluid samples meet head-on at said intersection forming a fluid flow;
forming sharp-edged structures in said fluid channel;
breaking said fluid flow with said sharp-edged structures thereby increasing turbulence.

29. An apparatus for mixing, comprising:
a fluid channel having a channel roof and a channel floor;
a plurality of sharp-edged structures positioned within said fluid channel with at least one end connected to said channel roof or said channel floor.

30. An apparatus as in claim 29, wherein said sharp-edged structures are triangular pillars.

31. A method for mixing, comprising:
forming a first fluid channel, a second fluid channel, and a third fluid channel wherein said first, second, and third fluid channel forms an intersection;
first injecting a first liquid sample at a first fluid velocity in said first fluid channel;
second injecting a second liquid sample at a second fluid velocity in said second fluid channel, wherein said first liquid sample and said second liquid sample meet at said intersection;
flowing said first liquid sample and said second liquid sample out of said intersection into said third fluid channel at an angle.

32. A method as in 31, wherein said first fluid velocity and said second fluid velocity are similar.

33. A method as in 32, wherein said angle is 90 degrees.

* * * * *